United States Patent
Laselva et al.

(10) Patent No.: US 10,588,051 B2
(45) Date of Patent: Mar. 10, 2020

(54) METHOD AND APPARATUS FOR OFFLOADING NETWORK TRAFFIC

(71) Applicant: Nokia Solutions and Networks Oy, Espoo (FI)

(72) Inventors: Daniela Laselva, Klarup (DK); Woonhee Hwang, Espoo (FI); Tero Henttonen, Espoo (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 15/309,689

(22) PCT Filed: May 8, 2014

(86) PCT No.: PCT/EP2014/059425
§ 371 (c)(1),
(2) Date: Nov. 8, 2016

(87) PCT Pub. No.: WO2015/169364
PCT Pub. Date: Nov. 12, 2015

(65) Prior Publication Data
US 2017/0150398 A1    May 25, 2017

(51) Int. Cl.
*H04W 28/08* (2009.01)
*H04W 36/16* (2009.01)
(Continued)

(52) U.S. Cl.
CPC ......... *H04W 28/08* (2013.01); *H04W 36/165* (2013.01); *H04W 48/18* (2013.01);
(Continued)

(58) Field of Classification Search
CPC ... H04W 28/08; H04W 36/165; H04W 48/18; H04W 84/12; H04W 84/042; H04W 88/06
(Continued)

(56) References Cited

U.S. PATENT DOCUMENTS 7,356,015 B2 *   4/2008   Ibe ................... H04W 36/0011
                                                    370/338
8,078,175 B2 * 12/2011   Salkintzis ......... H04W 36/0016
                                                    370/331
(Continued)

OTHER PUBLICATIONS

International Search Report and Written Opinion received for corresponding Patent Cooperation Treaty Application No. PCT/EP2014/059425, dated Jan. 22, 2015, 13 pages.
(Continued)

*Primary Examiner* — Man U Phan
(74) *Attorney, Agent, or Firm* — Squire Patton Boggs (US) LLP

(57) ABSTRACT

A method of avoiding mass offloading of user devices, UE's (14), connected to a cellular network (15, 16) such as 3GPP LTE to a second wireless network such as a WLAN (6,8), the method comprising: an ANDSF server (12) broadcasting (in a SIB message, for example) a set of parameters representing offload thresholds to be applied by UE's in idle mode, and also additional information such as a bitmap indicating which of those parameters are also applicable to UE's in connected mode; and a user device, UE (14), receiving the set of parameters and the additional information, and deciding whether to migrate or not to the second network in dependence of whether it is in idle or connected mode, of the parameters and of the additional information.

14 Claims, 4 Drawing Sheets

(51) Int. Cl.
*H04W 48/18* (2009.01)
*H04W 84/04* (2009.01)
*H04W 84/12* (2009.01)
*H04W 88/06* (2009.01)

(52) U.S. Cl.
CPC .......... *H04W 84/042* (2013.01); *H04W 84/12* (2013.01); *H04W 88/06* (2013.01)

(58) Field of Classification Search
USPC .......... 370/252–254, 328–331; 455/454–502
See application file for complete search history.

(56) References Cited

U.S. PATENT DOCUMENTS

| | | | | |
|---|---|---|---|---|
| 8,489,108 B2* | 7/2013 | Chan | ................ | H04W 36/0061 |
| | | | | 455/436 |
| 8,565,766 B2* | 10/2013 | Scherzer | ............... | H04W 72/02 |
| | | | | 455/432.3 |
| 8,942,205 B2* | 1/2015 | Mach | ................... | H04W 48/20 |
| | | | | 370/252 |
| 8,976,657 B2* | 3/2015 | Fang | ..................... | H04W 36/22 |
| | | | | 370/235 |
| 8,989,742 B2* | 3/2015 | Ramachandran | ..... | H04W 48/18 |
| | | | | 455/436 |
| 9,100,852 B2* | 8/2015 | Xiang | ............... | H04W 28/0231 |
| 9,414,392 B2* | 8/2016 | Sirotkin | ................ | H04W 48/06 |
| 9,585,067 B2* | 2/2017 | Wang | ................... | H04J 11/0093 |
| 9,603,065 B2* | 3/2017 | Nory | ..................... | H04W 48/10 |
| 9,629,028 B2* | 4/2017 | Meylan | ................ | H04W 28/16 |
| 9,661,544 B2* | 5/2017 | Jamadagni | ............ | H04W 36/22 |
| 9,820,187 B2* | 11/2017 | Sirotkin | ................ | H04W 28/08 |
| 9,843,997 B2* | 12/2017 | Wei | ....................... | H04W 48/18 |
| 9,877,256 B2* | 1/2018 | Sirotkin | ................ | H04W 48/00 |
| 9,894,569 B2* | 2/2018 | Lee | .................... | H04W 36/0066 |
| 9,894,581 B2* | 2/2018 | Sirotkin | ................ | H04W 8/005 |
| 9,906,983 B2* | 2/2018 | Sirotkin | ................ | H04W 28/08 |
| 10,104,540 B2* | 10/2018 | Horn | .................... | H04W 76/16 |
| 10,123,241 B2* | 11/2018 | Brown | ................. | H04W 48/12 |
| 10,194,360 B2* | 1/2019 | Sirotkin | ................ | H04W 24/10 |
| 10,194,361 B2* | 1/2019 | Sirotkin | ................ | H04W 24/10 |
| 10,219,281 B2* | 2/2019 | Sirotkin | ................ | H04W 48/06 |
| 2006/0002355 A1* | 1/2006 | Baek | ..................... | H04W 36/14 |
| | | | | 370/338 |
| 2014/0133294 A1* | 5/2014 | Horn | ................. | H04W 28/0247 |
| | | | | 370/230 |
| 2014/0213256 A1* | 7/2014 | Meylan | ................. | H04W 48/18 |
| | | | | 455/436 |
| 2014/0219253 A1* | 8/2014 | Henttonen | ............ | H04W 36/30 |
| | | | | 370/332 |
| 2015/0264637 A1* | 9/2015 | Zaus | ..................... | H04W 48/16 |
| | | | | 455/434 |
| 2017/0195949 A1* | 7/2017 | Nagasaka | ............. | H04W 48/18 |
| 2017/0215105 A1* | 7/2017 | Tan Bergstrom | ..... | H04W 48/18 |
| 2017/0311233 A1* | 10/2017 | Du | ......................... | H04W 48/10 |

OTHER PUBLICATIONS

NSN et al.; "(Compromising) WLAN IW Solution for UEs with and without ANDSF", 3GPP TSG-RAN WG2 Meeting #83, R2-132327, Barcelona, Spain, Aug. 19-23, 2013, 5 pages.

Ericsson et al. "Way forward for WLAN/3GPP Radio interworking", 3GPP TSG-RAN WG2 #83, R2-132827, Barcelona, Spain, Aug. 19-23, 2013, 8 pages.

* cited by examiner

US 10,588,051 B2

METHOD AND APPARATUS FOR OFFLOADING NETWORK TRAFFIC

RELATED APPLICATION

This application was originally filed as Patent Cooperation Treaty Application No. PCT/EP2014/059425 filed May 8, 2014.

This disclosure relates to a method and apparatus and in particular but not exclusively to method and apparatus for use in the interworking between a cellular wireless network and wireless local area network.

A communication system can be seen as a facility that enables communication sessions between two or more nodes such as fixed or mobile communication devices, access points such as nodes, base stations, servers, hosts, machine type servers, routers, and so on. A communication system and compatible communicating devices typically operate in accordance with a given standard or specification which sets out what the various entities associated with the system are permitted to do and how that should be achieved. For example, the standards, specifications and related protocols can define the manner how communication devices shall communicate with the access points, how various aspects of the communications shall be implemented and how the devices and functionalities thereof shall be configured.

A user can access the communication system by means of an appropriate communication device. A communication device of a user is often referred to as user equipment (UE), user device or terminal.

Signals can be carried on wired or wireless carriers. Examples of wireless systems include public land mobile networks (PLMN), satellite based communication systems and different wireless local networks, for example wireless local area networks (WLAN). Wireless systems can be divided into coverage areas referred to as cells, such systems being often referred to as cellular systems. A cell can be provided by a wireless access node such as a base station, there being various different types of base stations. Different types of cells can provide different features. For example, cells can have different shapes, sizes, functionalities and other characteristics. A cell is typically controlled by a control node.

A communication device is provided with an appropriate signal receiving and transmitting arrangement for enabling communications with other parties. In wireless systems a communication device typically provides a transceiver station that can communicate with another communication device such as e.g. a base station and/or another user equipment. A communication device such as a user equipment (UE) may access a carrier provided by a base station, and transmit and/or receive on the carrier.

An example of cellular communication systems is an architecture that is being standardized by the 3rd Generation Partnership Project (3GPP). A recent development in this field is often referred to as the long-term evolution (LTE) or long-term evolution advanced (LTE advanced) of the Universal Mobile Telecommunications System (UMTS) radio-access technology. In LTE base stations providing the cells are commonly referred to as enhanced NodeBs (eNB). An eNB can provide coverage for an entire cell or similar radio service area.

WLAN networks are becoming an integrated part of mobile broadband. WLAN is a standard feature on some phones such as smart phones, tablets and laptops.

According to an aspect, there is provided a method comprising: receiving a set of parameters at a user device for determining if a user device is use an access node of a first network or an access node of a second network, and using one or more parameters of said set in dependence on a mode of said user device.

The method may comprise receiving with said parameters, information indicating which parameters of said set are to be used in which of said idle and connected modes.

The information may comprise a bitmap.

The information may be provided for each of said parameters.

One or more parameters of said set may be provided with respective information.

The information may comprise information indicating said set of parameters is to be used by said user device if said user device is in a respective mode.

The information may comprise a bit.

The mode of said user device may comprise one of a connected mode and an idle mode.

The first and second networks may be of different network types.

One of said first and second networks may be a cellular communication network and the other of said first and second network is a wireless area network.

The method may be performed in an apparatus in a user equipment.

According to another aspect, there is provided a method comprising: causing a set of parameters to be transmitted to a user device for determining if a user device is to use an access node of a first network or an access node of a second network, wherein at least some of said parameters are associated with one of a plurality of different modes of said user device.

The method may comprise causing information indicating which parameters of said set are to be used in which of said idle and connected modes, to be transmitted with said parameters.

The information may comprise a bitmap.

The information may be provided for each of said parameters.

One or more parameters of said set may be provided with respective information.

The information may comprise information indicating said set of parameters is to be used by said user device if said user device is in a respective mode.

The information may comprise a bit.

The mode of said user device may comprise one of a connected mode and an idle mode.

The first and second networks may be of different network types.

One of said first and second networks may be a cellular communication network and the other of said first and second networks is a wireless area network.

The method may be performed by an apparatus in a base station.

According to an aspect, there is provided an apparatus in a user device comprising at least one processor and at least one memory including computer code for one or more programs, the at least one memory and the computer code configured, with the at least one processor, to cause the apparatus at least to: receive a set of parameters, said parameters being usable to determine if a user device is use an access node of a first network or an access node of a second network, and use one or more parameters of said set in dependence on a mode of said user device.

The at least one memory and the computer code may be configured, with the at least one processor, to cause the apparatus to receive with said parameters, information indicating which parameters of said set are to be used in which of said idle and connected modes.

The information may comprise a bitmap.

The information may be provided for each of said parameters.

One or more parameters of said set may be provided with respective information.

The information may comprise information indicating said set of parameters is to be used by said user device if said user device is in a respective mode.

The information may comprise a bit.

The mode of said user device may comprise one of a connected mode and an idle mode.

The first and second networks may be of different network types.

One of said first and second networks may be a cellular communication network and the other of said first and second network is a wireless area network.

According to an aspect, there is provided an apparatus comprising at least one processor and at least one memory including computer code for one or more programs, the at least one memory and the computer code configured, with the at least one processor, to cause the apparatus at least to: cause a set of parameters to be transmitted to a user device, said parameters being usable to determine if a user device is to use an access node of a first network or an access node of a second network, wherein at least some of said parameters are associated with one of a plurality of different modes of said user device.

The at least one memory and the computer code may be configured, with the at least one processor, to cause the apparatus to cause information indicating which parameters of said set are to be used in which of said idle and connected modes, to be transmitted with said parameters.

The information may comprise a bitmap.

The information may be provided for each of said parameters.

One or more parameters of said set may be provided with respective information.

The information may comprise information indicating said set of parameters is to be used by said user device if said user device is in a respective mode.

The information may comprise a bit.

The mode of said user device may comprise one of a connected mode and an idle mode.

The first and second networks may be of different network types.

One of said first and second networks may be a cellular communication network and the other of said first and second networks is a wireless area network.

The method may be performed by an apparatus in a base station.

According to an aspect, there is provided an apparatus in a user equipment, said apparatus comprising: means for receiving a set of parameters for determining if a user device is use an access node of a first network or an access node of a second network, and using one or more parameters of said set in dependence on a mode of said user device.

The apparatus may comprise means for receiving with said parameters, information indicating which parameters of said set are to be used in which of said idle and connected modes.

The information may comprise a bitmap.

The information may be provided for each of said parameters.

One or more parameters of said set may be provided with respective information.

The information may comprise information indicating said set of parameters is to be used by said user device if said user device is in a respective mode.

The information may comprise a bit.

The mode of said user device may comprise one of a connected mode and an idle mode.

The first and second networks may be of different network types.

One of said first and second networks may be a cellular communication network and the other of said first and second networks is a wireless area network.

According to another aspect, there is provided an apparatus comprising: means for causing a set of parameters to be transmitted to a user device for determining if a user device is to use an access node of a first network or an access node of a second network, wherein at least some of said parameters are associated with one of a plurality of different modes of said user device.

The apparatus may comprise means for causing information indicating which parameters of said set are to be used in which of said idle and connected modes, to be transmitted with said parameters.

The information may comprise a bitmap.

The information may be provided for each of said parameters.

One or more parameters of said set may be provided with respective information.

The information may comprise information indicating said set of parameters is to be used by said user device if said user device is in a respective mode.

The information may comprise a bit.

The mode of said user device may comprise one of a connected mode and an idle mode.

The first and second networks may be of different network types.

One of said first and second networks may be a cellular communication network and the other of said first and second networks is a wireless area network.

The apparatus may be in a base station.

A computer program comprising program code means adapted to perform the method(s) may also be provided. The computer program may be stored and/or otherwise embodied by means of a carrier medium.

In the above, many different embodiments have been described. It should be appreciated that further embodiments may be provided by the combination of any two or more of the embodiments described above.

Various other aspects and further embodiments are also described in the following detailed description and in the attached claims.

Embodiments may combine one or more features from one or more aspects. Various other aspects and further embodiments are also described in the following detailed description and in the attached claims.

Embodiments will now be described in further detail, by way of example only, with reference to the following examples and accompanying drawings, in which.

Figure 1:
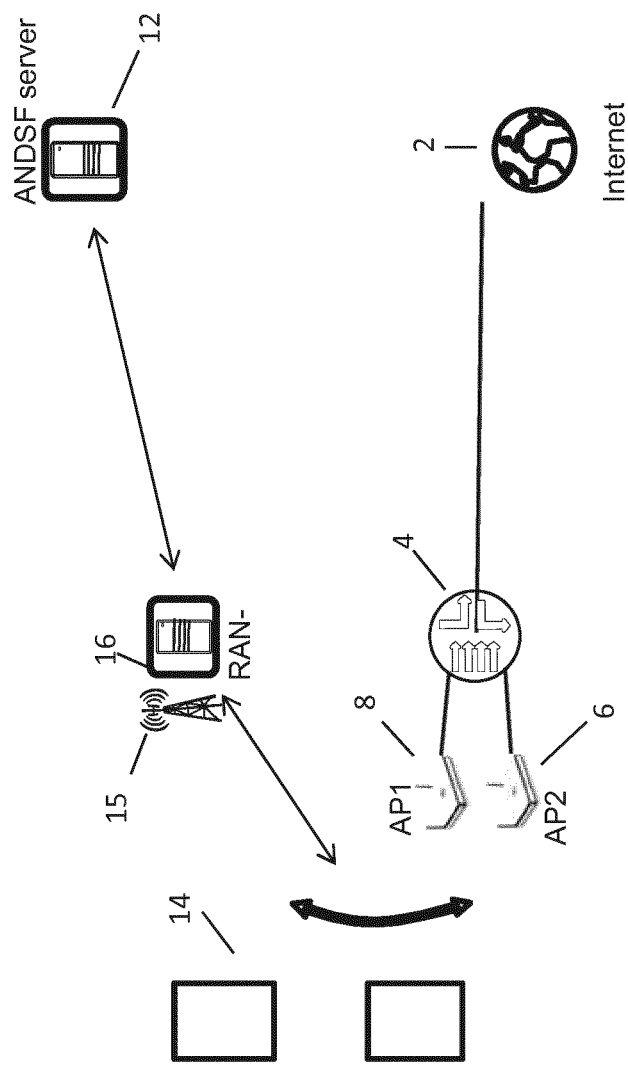
FIG. 1 shows an architecture with a WLAN and a wireless cellular network.

Reference numerals refer to the same element throughout the description and figures.

WLAN networks are in some places becoming an integral part of mobile broadband. WLAN is a standard feature on some smart phones, tablets and laptops. Some operators are using or planning to use WLAN alongside mobile radio access networks. As WLAN becomes just another cell alongside mobile radio access networks, some operators need to control how the user device or user equipment moves between the mobile and WLAN networks.

Mobile network operators are thus using cellular offloading to (carrier/third parties) WLAN networks for capacity and coverage purposes. The use of WLAN networks may be inexpensive in terms of licensing for spectrum and/or for cost of deployment). WLAN networks may offer good network performance in high-traffic urban environments.

Furthermore, even without any operator control, today's subscriber's traffic simply disappears from cellular networks as users prefer WLAN access points whenever these are available, e.g. at home or in the work place. That is because WLAN network discovery, selection and access is terminal implementation specific and may further be user-controlled via a connection manager utility installed at the client side. This may provide ad-hoc connectivity.

Reference is made to FIG. 1 which shows a high level network architecture example with an ANDSF server. The system shown in FIG. 1 comprises user equipment 14. The user equipment is arranged to be able to connect to a first access point or a second access point 6 or 8. As an example, the access points 6 and 8 are connected to a router 4 which permits connection to the Internet 2. The access points 6 and 8 along with the router 4 can be considered to provide the WLAN function. The access points may be part of a WLAN. In some embodiments, the access points may belong to different WLANs. In practice, there are multiple deployment possibilities for WLAN. In operator cases, there may be a WLAN Controller to which access are connected. The WLAN Controller is then attached to operator backbone, in practice at least to a router providing access to the Internet.

The user equipment 14 is also arranged to be able to connect to an access node 15 of a radio access network. The access node 15 may be a base station, node B or the like. Also provided is a RAN (radio access network) controller 16, in some embodiments. The RAN is made up of the base station or node B and the controller. In some embodiments, the controller and the access node may be provided by a common entity such as an eNodeB.

Also shown is an ANDSF server 12 which is connected using either a 3GPP or non 3GPP IP access to the UE. The ANDSF server is an approach to providing overall and static network selection policies to a user device. ANDSF policies may be fixed per geographical area and time of the day. These policies may include for example the roaming partner WLAN networks the user device should utilize when available, overall network selection policies for operator hotspots, and default network discovery and selection rules for the UE.

In other embodiments, alternatively or additionally ANDSF related functionality may be placed elsewhere in the network, such as the packet core and P-GW/DPI (Packet gateway/Deep Packet Inspection or PCRF (Policy and Charging Rules Function, like PCRF-ANDSF).

Figure 2:
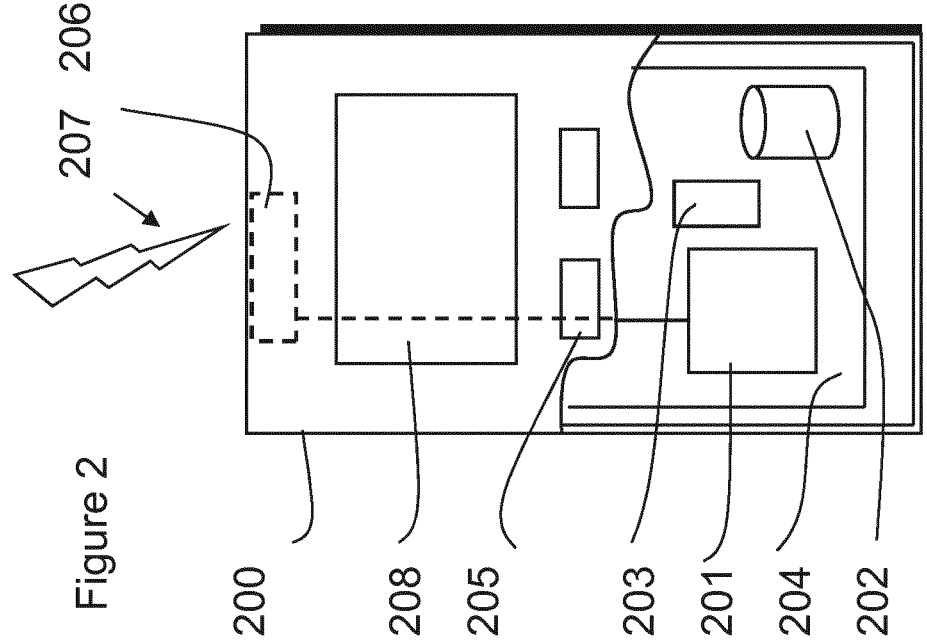
FIG. 2 shows a user equipment.

A possible mobile communication device suitable for implementing some embodiments will now be described in more detail in reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples include a mobile station (MS) such as a mobile phone or what is known as a 'smart phone', a computer provided with a wireless interface card, USB stick or 'dangle' with radio, or other wireless interface facility, personal data assistant (PDA) provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. Users may also be provided broadcast or multicast data. Non-limiting examples of the content include downloads, television and radio programs, videos, advertisements, various alerts and other information.

The mobile device 200 may receive signals over an air interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The radio part may be arranged to communicate simultaneously with different stations. The radio part may also be arranged to communicate via different radio technologies. For example, the radio part can provide a plurality of different radios. The antenna arrangement may be arranged internally or externally to the mobile device.

A mobile device is also typically provided with at least one data processing entity 201 such as a processor, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The at least one memory may be implemented as at least one memory unit within the processor or externally to the processor. In the latter case it may be communicatively coupled to the processor via various means, as is known in the art. The mobile communication device may also use cloud services.

The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

The communication devices can access the communication system based on various access techniques, such as 3GPP standardized Long Term Evolution (LTE), Code Division Multiple Access (CDMA), or Wideband CDMA (WCDMA). Other examples include Time Division Multiple Access (TDMA), Frequency Division Multiple Access (FDMA) and various schemes thereof such as the Interleaved Frequency Division Multiple Access (IFDMA), Single Carrier Frequency Division Multiple Access (SC-FDMA) and Orthogonal Frequency Division Multiple Access (OFDMA), Space Division Multiple Access (SDMA) and so on. Some communication devices can in addition also access local area or wide area communications systems based on various non-3GPP standardized access techniques such as Wireless Local Area Network (WLAN) and/or WiMax (Worldwide Interoperability for Microwave Access) and/or HRPD (High Rate Packet Data, commonly known as 1xEV-DO).

Further development of the LTE is referred to as LTE-Advanced. Non-limiting examples of appropriate LTE access nodes are a base station of a cellular system, for example what is known as evolved NodeB (eNB) in the vocabulary of the 3GPP specifications.

Figure 3:
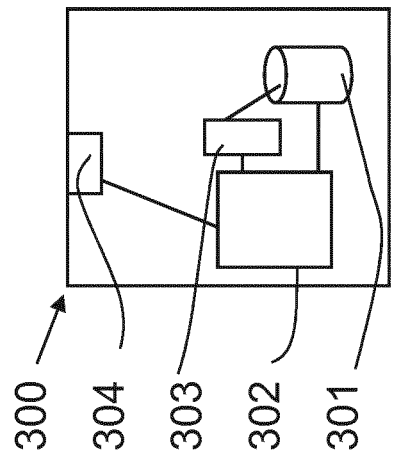
FIG. 3 shows a control apparatus.

One or more entities of the RAN may be provided with a control apparatus. FIG. 3 shows an example of a control apparatus. The control apparatus 300 can be configured to provide control functions. For this purpose the control apparatus 300 comprises at least one memory 301, at least one data processing unit 302, 303 and an input/output interface 304. Via the interface the control apparatus can be coupled to receive information and/or commands and/or provide as output information and/or commands. The control apparatus 300 can be configured to execute an appropriate software code to provide the control functions. The components/facilities may be software, hardware or combinations thereof. It will be understood that within the apparatus 300 the data processing unit and memory may be implemented in one or more physical or logical entities.

Thus some Mobile Network Operators (MNOs) are deploying carrier-grade Wireless Local Area Network (WLAN) as a complementary system to cellular networks. Network-controlled load balancing between cellular and WLAN systems is one aspect which may improve network performance and user experience.

Some embodiments may be used to provide a dynamic extension to existing Access Network Discovery and Selection Function (ANDSF) functionalities which may be relatively static.

It has been proposed to provide RAN signalling of RAN assistance thresholds for the purpose of WLAN interworking. The UE may decide based on those thresholds whether to steer its traffic to an available WLAN access point (AP) or to cellular access point or to do nothing. For example, a UE will offload traffic to WLAN if measured RSRP<RSRP_threshold and a WLAN is available.

A common set of parameters may be broadcast in a SIB (system information broadcast) to be used by both idle mode and connected mode UEs. An operator can override the broadcast common parameters for specific UEs by using dedicated RRC signalling. For example, if an operator provides the set of RAN assistance parameters in the dedicated RRC signalling, they will override the common parameters in the broadcast signalling.

In an alternative approach, a common set of parameters may be broadcast in a SIB to be implicitly used by only idle mode UEs. For connected mode UEs, an operator can indicate parameters by using dedicated RRC signalling.

In certain situations it may not be desirable that connected mode UEs use some or all of the common set of RAN assistance parameters in the SIB in the same manner as idle mode UEs. As an example, mass migrations between LTE and WLAN (sometimes called "mass toggling") could be caused by a large population of connected mode UEs applying updated broadcast thresholds at the same time and resulting in e.g. congested WLAN AP(s). To prevent this mass toggling, the network can individually signal all connected mode UEs not to offload to WLAN AP(s) as connected mode signalling will override parameters in the system information but this may generate excessive signalling overhead.

The inventors have also appreciated that one or more threshold value(s) may be more relevant for idle mode UEs than connected mode UE. Some embodiments may provide, in the dedicated message, an indicator of which combination of parameters provided via dedicated signalling and/or broadcast (common) signalling the UE shall use when in a connected mode. This may alternatively or additionally be used in the case where connected mode UEs normally do not utilize the SIB parameters.

In some embodiments the RAN may provide information to the UEs in the system information with the parameters themselves, to indicate whether and/or which RAN assistance parameters provided in the system information should be used for WLAN interworking by connected mode UEs.

In some embodiments, the RAN indication may be represented by a single value or bit to indicate whether all or none of the RAN parameters broadcast by a cell should be used by UEs in a connected mode to evaluate WLAN offloading.

Alternatively, the indicator may be in the form of a bitmap which determines the parameter combination the UE shall use when in connected mode. The remaining parameters may be ignored by UEs in connected mode.

Alternatively, the indicator may be in the form of a bitmap which determines the parameter combination the UE shall use when in an idle mode only. The remaining parameters may be used by the UEs in a connected mode.

Alternatively, the indicator may be only addressed to a group of UEs that are further identified by an indicating parameter. Only those UEs would utilize the indicator for determining which parameters to use in a connected mode. The indicator may be addressed to one UE, a group of UEs or all UEs.

This indicating parameter may be implicitly tied to the UE identity (e.g. in a similar way as access class barring one or more applicable UEs. The indicating parameter may be included in the message with the indicator).

In some embodiments each RAN parameter has indication that the parameter shall be used by UEs in the connected mode or not.

In some embodiments, the position of a particular parameter in a SIB may be predefined and the UE may have information as to which one or more parameters to use in the connected mode and/or idle mode. The UE may be provided with this information separately.

In some embodiments, a SIB for connected UEs may be provided separately from a SIB for idle UEs.

It should be appreciated that some embodiments may use a combination of one or more of the above methods for providing information as to whether a UE is to use the values provided in the SIB message.

In some embodiments, this enables RAN and/or operator control over the offloading parameters applied by UEs, depending on if they are in a connected mode or an idle mode. This may avoid mass toggling situations during, e.g. mass events. For example as soon as new thresholds are broadcast those would apply only to idle mode UEs and not for connected mode UEs in order to avoid that a large population of UEs attempt to offload simultaneously to a WLAN overwhelming an WLAN AP.

Figure 4:
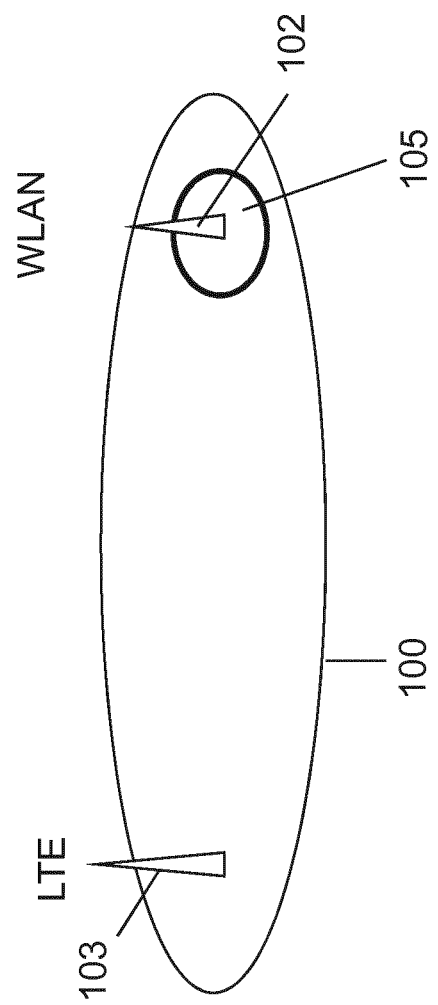
FIG. 4 shows a base station and WLAN node.

Reference is now made to FIG. 4 which shows a LTE base station and WLAN access point. A base station 103 is provided in a different location to the WLAN access node 102. A cell is schematically represented by reference 100.

The RSRP-based mechanism determines the area/locations where UEs are targeted for offloading to WLAN. For example the UE will be served by the WLAN access node when in region 105. This is where RSRP<Th_rsrp. RSRP is one example parameter. Any one or more other suitable parameters may alternatively or additionally be used. Other suitable parameters are RSRQ threshold, WLAN backhaul utilization, WLAN resource usage, UE internal logic to measure and handle the related measurements. Any other suitable mechanism may be used in other embodiments.

Figure 5:
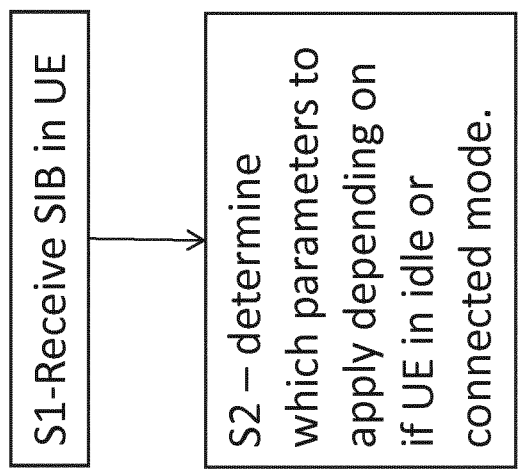
FIG. 5 shows a method carried out by an apparatus of a UE.

Reference is made to FIG. 5 which shows a method from the perspective of a UE. In step S1, the UE receives the SIB broadcast by the base station.

In step S2, the UE will in dependence on whether it is in a connected mode or an idle mode select those elements of the SIB which it is to apply or use.

The method of the UE may be performed by an apparatus in the UE. The apparatus may comprise one or more processor and at least one memory including computer code for one or more programs, the at least one memory and the computer code configured, with the at least one processor, to cause the method to be performed.

Figure 6:
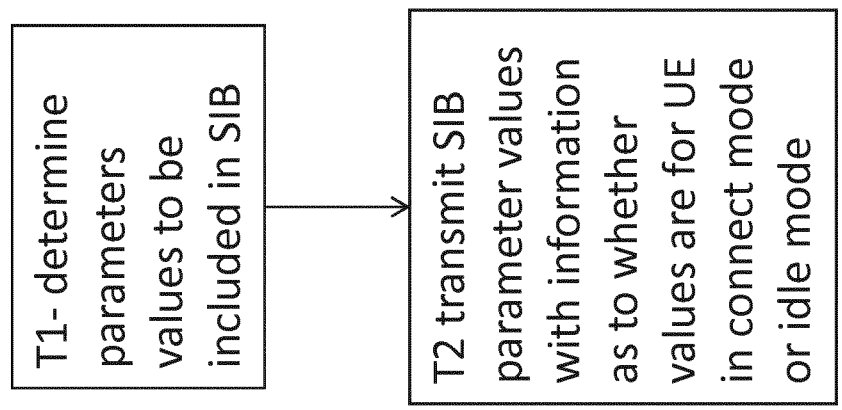
FIG. 6 shows a method of some embodiments.

Reference is made to FIG. 6 which shows a method.

In step T1, the parameter values that are to be included in the SIB are obtained, determined or otherwise provided.

In step T2, the SIB parameter values are transmitted with information as to whether the values are to be used by the UE in one of the following;
a) only when the UE is in the idle mode;
b) only when the UE is in a connected mode
c) some parameters may be used by the UE both in a connected mode and in idle mode. In some embodiments, a parameter in the set may be used just in a connected mode, just in an idle mode or may be usable in either mode.

In some embodiments, the information as to whether the values are for the UE in a connected mode or an idle mode may be determined as part of step T1, as part of step T2, as a separate step or as part of both steps T1 and T2.

In some embodiments, step T1 and/or step T2 may be performed by an apparatus in the base station. The apparatus may comprise one or more processor and at least one memory including computer code for one or more programs, the at least one memory and the computer code configured, with the at least one processor, to cause the method to be performed.

In some embodiments, the apparatus may receive input from the CN. For example, input about mobility may come from one or more of: MME (mobility management entity); information about subscriptions/traffic characteristics may be provided by DPI/PCRF (deep packet inspection/policy and charging rules function), and input about WLAN from a dedicated interface to a WLAN controller/ANDSF).

The parameters in the system information may comprise one or more of the following. $Thresh_{ServingOffloadWLAN, LowP}$
This specifies the RSRP threshold (in dBm) used by the UE for traffic steering to WLAN.
$Thresh_{ServingOffloadWLAN, HighP}$
This specifies the RSRP threshold (in dBm) used by the UE for traffic steering to the RAN.
$Thresh_{ServingOffloadWLAN, LowQ}$
This specifies the RSRQ threshold (in dB) used by the UE for traffic steering to WLAN.
$Thresh_{ServingOffloadWLAN, HighQ}$
This specifies the RSRQ threshold (in dB) used by the UE for traffic steering to RAN.
$Thresh_{ChUtilWLAN, Low}$
This specifies the WLAN channel utilization (BSS load) threshold used by the UE for traffic steering to WLAN.
$Thresh_{CHUtilWLAN, High}$
This specifies the WLAN channel utilization (BSS load) threshold used by the UE for traffic steering to RAN.
$Thresh_{BackhRateDLWLAN, Low}$
This specifies the backhaul available downlink bandwidth threshold used by the UE for traffic steering to E-UTRAN.
$Thresh_{BackhRateDLWLAN, High}$
This specifies the backhaul available downlink bandwidth threshold used by the UE for traffic steering to WLAN.
$Thresh_{BackhRateULWLAN, Low}$
This specifies the backhaul available uplink bandwidth threshold used by the UE for traffic steering to TRAN.
$Thresh_{BackhRateULWLAN, High}$
This specifies the backhaul available uplink bandwidth threshold used by the UE for traffic steering to WLAN.
$Tsteering_{WLAN}$
This specifies the timer value $Tsteering_{WLAN}$ during which the rules should be fulfilled before starting traffic steering between RAN and WLAN.
WLAN Identifiers
Provided SSIDs, BSSIDs or HESSIDs which shall be considered in the WLAN/3GPP Radio interworking mechanism.

In some embodiments, RSRP may be used for idle mode UEs. In some embodiments RSRQ alone or in addition to RSRP may be used by connected mode UEs.

In some embodiments, the type of parameter may be for the UE in the idle mode, the connected mode or in either mode.

In some embodiments, a value of the parameter may be for the UE in an idle mode and may have a different value for the UE in a connected mode. In some embodiments, both values may be provided in a SIB. In other embodiments, only one value may be provided in a SIB.

Some examples have a 3GPP cellular network and an IEEE standard WLAN.

Embodiments have been described in relation to WLAN and LTE RAN networks. It should be appreciated that these two networks are by way of example only. In some embodiments, other cellular communication networks may be used instead of LTE RAN networks. Other suitable wireless local networks can be used instead of the WLAN network. Some embodiments may be used with any two or more suitable networks.

As the embodiments have been described with reference to a LTE or similar network, reference has been made to RSRP measurements. It should be appreciated that any other suitable measurement may be used where a reference signal or symbol is transmitted with a known power by an access node to a user equipment. In the above embodiments, a comparison of a UE measurement vs. the corresponding RAN-provided threshold is described as being made with the RSRP or the like. It should be appreciated that in some embodiments, the comparison may be evaluated with information which is derived or dependent on the RSRP.

The required data processing apparatus and functions of an apparatus in a network element and/or a mobile device for the causing configuration, signalling, determinations, and/or control and so forth may be provided by means of one or more data processor. The described functions may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non-limiting examples or suitable circuitry. The data processing may be distributed across several data processing modules. A data processor may be provided by means of, for example, at least one chip. Appropriate memory capacity can also be provided in the relevant devices. The memory or memories may be of any circuitry type suitable to the local technical environment and may be implemented using any suitable data storage technology, such as semiconductor based memory devices, magnetic memory devices and systems, optical memory devices and systems, fixed memory and removable memory.

An appropriately adapted computer program code product or products may be used for implementing the embodiments, when loaded or otherwise provided on an appropriate data processing apparatus. The program code product for providing the operation may be stored on, provided and embodied by means of an appropriate carrier medium. An appropriate computer program can be embodied on a computer readable record medium. A possibility is to download the program code product via a data network. In general, the various embodiments may be implemented in hardware or special purpose circuits, software, logic or any combination thereof. Embodiments may be practiced in various components such as integrated circuit modules. The design of integrated circuits is by and large an automated process. Complex and powerful tools are available for converting a logic level design into a semiconductor circuit design ready to be formed on a semiconductor substrate.

The foregoing description has provided by way of exemplary and non-limiting examples a full and informative description of some embodiments. However, various modifications and adaptations may become apparent to those skilled in the relevant arts in view of the foregoing description, when read in conjunction with the accompanying drawings and the appended claims. For example, a combination of one or more of any of the other embodiments previously discussed can be provided.

All such and similar modifications will still fall within the scope of this invention as defined in the appended claims.

Various modifications to the embodiments described above will readily occur to the skilled person. The invention is not limited to these specific examples.

The invention claimed is:

1. A method comprising:
receiving, at a user device, a set of parameters broadcast in a system information broadcast for determining if the user device is to use an access node of a first network or an access node of a second network, wherein the set of parameters comprise at least one radio access network assistance threshold associated with wireless local area network interworking; and
using one or more of the parameters based upon on a mode of the user device, wherein the user device is configured to determine, based upon the at least one RAN assistance threshold, whether to steer traffic to an available wireless local area network access point or a cellular access point, wherein
said mode of said user device comprises one of a connected mode and an idle mode, and
one or more parameters of said set is provided with respective information indicating whether the respective parameter is to be used in at least one of said idle and connected modes.

2. The method of claim 1, comprising receiving with said parameters, information indicating which parameters of said set are to be used in which of said idle and connected modes.

3. The method of claim 2, wherein said information is provided for each of said parameters.

4. The method of claim 2, wherein said information comprises information indicating said set of parameters is to be used by said user device if said user device is in a respective mode.

5. The method of claim 4, wherein said information comprises a bit.

6. The method of claim 1, wherein said first and second networks are of different network types.

7. The method of claim 6, wherein one of said first and second network is a cellular communication network and the other of said first and second networks is a wireless local area network.

8. An apparatus comprising at least one processor and at least one memory including computer code for one or more programs, the at least one memory and the computer code configured, with the at least one processor, to cause the apparatus at least to:
receive a set of parameters broadcast in a system information broadcast, said parameters being usable to determine if a user device is to use an access node of a first network or an access node of a second network, wherein the set of parameters comprise at least one radio access network assistance threshold associated with wireless local area network interworking; and
use one or more of the parameters based upon on a mode of the user device, wherein the user device is configured to determine, based upon the at least one RAN assistance threshold, whether to steer traffic to an available wireless local area network access point or a cellular access point, wherein
said mode of said user device comprises one of a connected mode and an idle mode, and
one or more parameters of said set is provided with respective information indicating whether the respective parameter is to be used in at least one of said idle and connected modes.

9. The apparatus of claim 8, comprising receiving with said parameters, information indicating which parameters of said set are to be used in which of said idle and connected modes.

10. The apparatus of claim 9, wherein said information is provided for each of said parameters.

11. The apparatus of claim 9, wherein said information comprises information indicating said set of parameters is to be used by said user device if said user device is in a respective mode.

12. The apparatus of claim 11, wherein said information is comprised in a bit.

13. The apparatus of claim 8, wherein one of said first and second network is a cellular communication network and the other of said first and second networks is a wireless local area network.

14. An apparatus comprising at least one processor and at least one memory including computer code for one or more programs, the at least one memory and the computer code configured, with the at least one processor, to cause the apparatus at least to:
cause a set of parameters to be transmitted in a system information broadcast to a user device, said parameters being usable to determine if the user device is to use an access node of a first network or an access node of a second network, wherein the set of parameters comprise at least one radio access network assistance threshold associated with wireless local area network interworking, and wherein the set of parameters are configured to be used to determine, based upon the at least one RAN assistance threshold, whether to steer traffic to an available wireless local area network access point or a cellular access point, wherein the plurality of different modes comprises an idle mode and a connected mode, and the at least one memory and the computer code configured, with the at least one processor, to further cause the apparatus at least to: causing information indicating which parameters of said set are to be used in which of said idle and connected modes, to be transmitted with said parameters.

\* \* \* \* \*